United States Patent Office 3,199,347
Patented Aug. 10, 1965

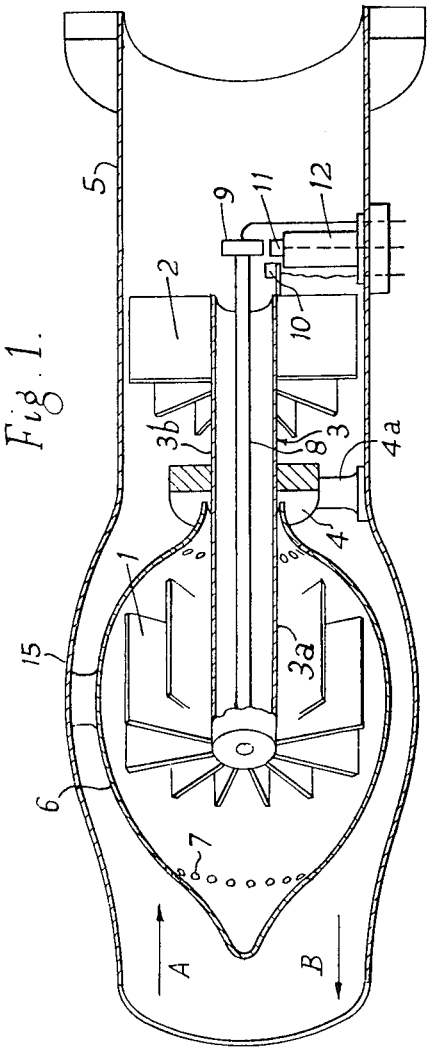
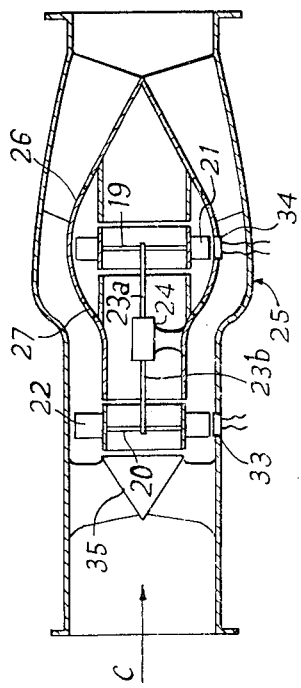

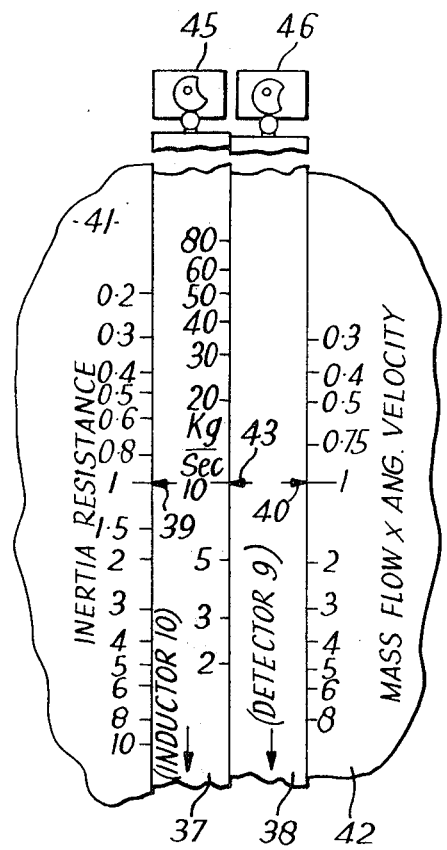

3,199,347
FLUID-FLOW METERING DEVICES
Norman Moss, Ilford, England, assignor to The Plessey Company Limited, Essex, England, a British company
Filed Mar. 27, 1963, Ser. No. 268,494
Claims priority, application Great Britain, Apr. 6, 1962, 8,497/62
5 Claims. (Cl. 73—194)

This invention relates to mass-flow meters of the kind described in my co-pending applications Serial No. 255,-717, filed January 28, 1963 in which the mass flow in a duct is determined as the quotient of the torque produced by a variation of the angular momentum of the flow divided by the corresponding variation in angular speed, and it has for an object to provide an improved mass-flow meter of the kind specified which can be constructed without the use of bearings or rotary seals in the liquid, so as to be relatively insensitive to the presence of abrasive material in the liquid.

According to the present invention a vibratory motor is employed to impart, through a resilient shaft, to a vane or set of vanes arranged axially in the flow reciprocatory angular movement about an axis extending in the direction of the flow, means being provided for determining the excess of the amplitude of the torque transmitted from the motor to the vane or vanes through the resilient shaft, over the amplitude of the torque transmitted to a shaft of similarly related elasticity characteristics and inertia load which imparts no momentum, or a proportionally smaller momentum, to the flow, and also for determining the amplitude of the torque transmitted to the last-mentioned shaft. If the second inertia load imparts no momentum to the flow, the mass flow is proportional to the quotient of the two torque values thus determined.

The accompanying drawing illustrates two embodiments of the invention.

FIGURE 1 is a perspective view with some parts broken away of a duct through which the mass flow is arranged to pass and in which a device according to the present invention is mounted, and FIGURE 2 is an elevation in axial section showing a modified construction.

Referring now first to FIGURE 1, two vaned rotors 1 and 2 of identical construction are arranged at opposite ends of a torsionally resilient hollow shaft 3, which is fixed in the rotationally oscillating armature 4 of a vibratory motor 4, 4a so as to extend axially of a duct element 5 through which the flow of liquid to be measured is arranged to pass. The part 3a of shaft 3, which connects the rotor 1 with the armature 4, will hereinafter be called reference shaft, while the part 3b connecting the other rotor 2 with the armature 4 will be called the flow-sensitive shaft. The latter has the same torsional resistance characteristics as the reference shaft 3a. The vanes of each of the rotors 1 and 2 extend in the direction of the axis of the duct, and thus in the direction of the flow. One rotor 1, hereinafter called reference rotor, is arranged in a housing or pod 6 inside the duct element 5, which is so shaped as to offer minimum resistance to flow along the duct and is spaced from the wall of the duct element 5. In order to maintain substantially constant cross-section of the main flow, the duct element 5 is widened in diameter at the part 15 surrounding the pod 6. The wall of the pod 6 is provided with perforations 7, or alternatively may be made of porous material, so that the interior of the pod communicates hydrostatically with the liquid in the duct 5, but the liquid inside the pod 6 does not substantially participate in the axial flow movement of the main body of liquid.

Arranged co-axially inside the torsionally resilient hollow shaft 3 is a rigid inner shaft 8 one end of which is secured to the reference rotor 1 and to one end of the resilient reference shaft 3a while its other end projects through the free end of the resilient flow-sensitive shaft 3b, at the outer end of the flow-sensitive rotor 2. The rigid shaft 8 carries at its last-mentioned end a directional-field member, for example an electromagnetic bar 9, and two separate inductor members 10 and 11 are respectively provided at the outer end of the hollow flow-sensitive shaft 3b and on a stationary body 12, both near the outer end of the shaft 3b, to sense the amplitude of the oscillatory rotation of the rigid shaft 8, respectively in relation to the outer end of the flow-sensitive shaft 3b and to the fixed wall of the duct member 5. When oscillatory rotation is imparted to the shafts 3a and 3b by the motor 4, 4a preferably at such a rate as to produce resonance, the resistance to the rotation offered by the reference rotor 1 is proportional to the rate and amplitude of its rotary oscillation, and thus to the momentary angular acceleration, multiplied by the moment of inertia of the reference rotor 1 together with a supplementary inertia value due to the resultat movement of liquid in the pod 6, while the movement of the flow-sensitive rotor 2 has to overcome in addition to a similar intertial resistance, a further resistance proportional to the momentary angular speed of the rotor multiplied by the mass flow, which enters the flow-sensitive rotor 2 at zero angular speed and leaves it at an angular speed similar to that of the rotor. Since torques due to inertia will be equal at the ends of the two shafts 3a and 3b, such torques will not produce any relative angular displacement between the outer end of the shafts and the adjacent end of the rigid shaft 8 which participates in the rotation of the outer end of the reference shaft 3a. The torques due to inertia will therefore produce no indication on inductor 10, the indication on the latter being thus purely indicative of the product of mass flow and the R.M.S. value of angular velocity, while on the other hand the movement of field member 9 relative to the stationary detector 11 will be purely indicative of the inertia resistance of vanes 1 and, in the case of pure sinusoidal oscillations, its R.M.S. value will be proportional to the maximum angular velocity of the motor armature 4. It will thus be seen that the quotient obtained by dividing the indication of device 11 into the indication of the device 10 will be proportional to the mass flow, which can thus be measured in a convenient manner, for example by the mutual displacement of two logarithmic scales.

One form of suitable scale arrangement is indicated in FIGURE 3. The output current from the inductor 10 and from the detector 9 are respectively fed to A.-C. current measuring instruments 45 and 46 which are arranged, by any suitable means, diagrammatically illustrated as a cam and follower, to respectively move two scale members 37 and 38 in accordance with the logarithmic of the root mean square values of the currents supplied to them. Index marks 39 and 40 respectively of these scales each co-operate with a stationary logarithmic scale 41 or 42 whose indications respectively represent the inertial resistance and the product of mass flow and angular velocity. In addition the scale 38 carries an index mark 43 which co-operates with a further logarithmic scale 44 provided on the movable scale member 37, the direction of rising values of this scale being opposite to that of the scales 41 and 42. It will be readily appreciated by those skilled in the art that as a result the indication of index mark 43 on scale 44 will represent the quotient of the indication on scale 41 divided by the indication on scale 42, or in other words the quotient of the output of inductor 10 divided by the output of detector 9, or the mass flow. Accordingly this scale may be calibrated in mass-flow units such for example as kilogram per second.

It will be appreciated that since only the ratio of two outputs is utilised in the determination of the mass flow, the result will not be affected by the frequency at which the vibratory motor operates, but operation at resonant frequency is desirable because it produces maximum deflection and thus maximum accuracy of the measurement, and also because the movement becomes more truly sinusoidal; and it will be further appreciated that, since the motor armature 4 only carries out vibratory rotation, it may be resiliently secured in the stationary part, thus permitting the shaft 3 carrying the rotor blade systems 1 and 2 to be mounted without any need for the provision of bearings. Since the amplitude of the rotary vibrations of the motor need only be small, the motor may be constructed on the piezoelectric principle if desired.

The construction illustrated in FIGURE 1 may be used for flow in either of the directions indicated by the arrows A and B.

FIGURE 2 shows diagrammatically a generally similar construction, which is mainly intended for flow in the direction of the arrow C; corresponding to similar parts in FIGURE 1 have been indicated by the same reference numbers increased by 20. In order to ensure that the flow impinging upon the vanes of the flow-sensitive rotor 22 is as undisturbed as possible, this rotor has been placed at the inlet or upstream end of the duct member 25 and is preceded by a central fairing 35 whose diameter corresponds to the core diameter of the rotor 22. The reference rotor 21, enclosed in a streamlined pod 26, is arranged co-axially with the flow-sensitive rotor 22 at a distance from the latter downstream of the duct in a pod 26. This pod is extended as shown at 27 to close proximity of the central core of the rotor 22. This core is of hollow construction substantially isolating a body of liquid which, though in communication with the liquid in the flow passage containing the blades of the rotor 22, does not participate in the flow motion thereof, since the cavity encircled by the members 22, 26 and 27 is closed at the upstream end by the fairing 35 and at the downstream end by the streamlined tail portion of the pod 26. The rotors 31 and 22 are connected by co-axially arranged resilient shafts 23a and 23b to the armature of the rotary vibration motor 24, which is arranged in the centre of the above-mentioned cavity containing stagnant liquid. Two pick-up windings 33 and 34 are arranged in the stationary part of the device for respective co-operation with the field-producing member 19 or 20 of the rotors 22 and 21, and respectively pick up the torques applied to the mass-flow sensitive rotor 22 and to the reference rotor 21, so that in this case the mass flow will be obtained by dividing the difference between the indications of the two output windings by the indication of the output winding 34. This arrangement avoids the necessity of making shafts 23a and 23b hollow.

Other variations of the construction described with reference to the drawing may be made within the scope of the present invention. Thus it is not essential for the two vanes or sets of vanes to be identical, since, provided that their relative inertia is known, the ratio of resilience of the two shafts 3a and 3b or 23a and 23b may be so arranged as to compensate for vane systems of different inertia. Similarly it is not essential for one of the vanes or sets of vanes to be submerged in quiescent fluid, but such vane or set of vanes may alternatively be submerged in fluid the velocity of which is a known fraction of that of the fluid passing through the other vane or set of vanes. In this case measurement of the difference in angular motion between the two vanes or sets of vanes will still cancel completely the inertia effect, but a known proportion of the momentum effect will also be subtracted. This, however, only introduces a known co-efficient into the calculation.

What I claim is:

1. Apparatus for measuring the mass flow in a duct, comprising a duct element, a vibratory motor having an armature mounted for oscillatory rotation in the duct element with its axis of rotation extending longitudinally of the duct, a torsionally resilient flow-sensitive shaft supported in the duct element to extend longitudinally thereof and at least operatively connected to the armature at one point of its length, one impeller element extending radially from the said shaft at a point spaced longitudinally of the shaft from said one point, and connected to said point of the shaft for common oscillatory rotation about the axis of the shaft, a reference shaft extending coaxially with the flow-sensitive shaft and also connected to said armature, said reference shaft having torsional resilience characteristics similar to those of the said flow-sensitive shaft, inertia means secured to the reference shaft at an attachment point longitudinally spaced from the point of connection of the reference shaft to the motor armature equally, as regards torsional resilience, to the longitudinal spacing of the point of connection of said impeller element to the said flow-sensitive shaft from the point of connection of the armature to said flow-sensitive shaft, means determining the excess of the amplitude of the torque transmitted by the motor to the flow-sensitive shaft over the amplitude of the torque transmitted to the reference shaft and means determining the amplitude of the torque transmitted to one of said shafts.

2. Apparatus as claimed in claim 1, further including means determining the quotient of the two said amplitudes.

3. Apparatus as claimed in claim 1, wherein the inertia load of the reference shaft includes a body, not participating in the flow along the duct of the liquid whose mass flow is to be determined, the effective moment of inertia of said body being equal to that of the body of liquid participating in the rotation of the flow-sensitive shaft.

4. Apparatus as claimed in claim 1, wherein the flow-sensitive shaft and the reference shaft are hollow shafts extending in opposite directions from the vibratory motor, the motor having a through bore coaxial with said shafts, and wherein the apparatus additionally includes a rigid shaft extending co-axially inside the rotor and hollow shafts, which transmits the vibratory rotation of the reference rotor to a point adjacent to the flow-sensitive rotor.

5. Apparatus for measuring the mass flow in a duct, comprising a duct element, a vibratory motor having an armature mounted for oscillatory rotation in the duct element with its axis extending longitudinally of the duct, a torsionally resilient shaft supported in the duct element to extend longitudinally thereof and at least operatively connected to the armature at one point of its length, at least one impeller element extending radially from the shaft at a point spaced longitudinally of the shaft from said one point, and connected to the shaft for common oscillatory rotation about the axis of the shaft, a reference shaft extending coaxially with the resilient shaft and also connected to said armature, said reference shaft having torsional resilience characteristics similar to those of the said resilient shaft, inertia means secured to the reference shaft at a point longitudinally spaced from the point of connection of the reference shaft to the motor armature equally, as regards torsional resilience, to the longitudinal spacing of said impeller element on the said resilient shaft from the point of connection of the armature to said resilient shaft, means determining the amplitude of the torque transmitted by the motor to one of the two shafts comprising the flow-sensitive shaft and the reference shaft, and means determining the amplitude of the torque transmitted to the other of said shafts, at least relative to the torque transmitted to said one shaft.

References Cited by the Examiner

UNITED STATES PATENTS 3,080,750   3/63   Wiley et al. _____ 73—194

RICHARD C. QUEISSER, *Primary Examiner.*